(12) United States Patent
Yamada

(10) Patent No.: US 10,070,012 B2
(45) Date of Patent: Sep. 4, 2018

(54) IMAGE FORMING APPARATUS CONTROL METHOD FOR THE IMAGE FORMING APPARATUS, AND STORAGE MEDIUM, THAT RECORD USER IDENTIFYING INFORMATION FOR USE IN IDENTIFYING PRINT DATA AS REGISTRATION INFORMATION

(71) Applicant: CANON KABUSHIKI KAISHA, Tokyo (JP)

(72) Inventor: Tetsuya Yamada, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/993,411

(22) Filed: Jan. 12, 2016

(65) Prior Publication Data

US 2016/0212300 A1    Jul. 21, 2016

(30) Foreign Application Priority Data

Jan. 16, 2015    (JP) .................................. 2015-006680

(51) Int. Cl.
*G06F 15/00* (2006.01)
*H04N 1/44* (2006.01)
*G06F 3/12* (2006.01)

(52) U.S. Cl.
CPC ......... *H04N 1/4413* (2013.01); *G06F 3/1222* (2013.01); *G06F 3/1238* (2013.01); *G06F 3/1287* (2013.01); *G06F 3/1292* (2013.01); *H04N 1/4406* (2013.01); *H04N 2201/0094* (2013.01)

(58) Field of Classification Search
CPC combination set(s) only.
See application file for complete search history.

(56) References Cited

U.S. PATENT DOCUMENTS

| 2009/0257078 | A1* | 10/2009 | Sawada | G06F 21/608 |
| | | | | 358/1.14 |
| 2012/0092691 | A1* | 4/2012 | Sasakuma | G06F 3/1204 |
| | | | | 358/1.13 |
| 2014/0092420 | A1* | 4/2014 | Fukudome | H04N 1/0023 |
| | | | | 358/1.14 |
| 2014/0168687 | A1* | 6/2014 | Kim | H04N 1/00342 |
| | | | | 358/1.14 |
| 2015/0022847 | A1* | 1/2015 | Nishida | G06F 3/1238 |
| | | | | 358/1.14 |
| 2015/0026782 | A1* | 1/2015 | Nishida | H04L 63/08 |
| | | | | 726/6 |

(Continued)

FOREIGN PATENT DOCUMENTS

JP    09-023329 A    1/1997

*Primary Examiner* — Henok A Shiferaw
(74) *Attorney, Agent, or Firm* — Rossi, Kimms & McDowell LLP

(57) ABSTRACT

An image forming apparatus which is able to reliably execute a job received from a mobile device. When a job with user information is received from the mobile device connected to the image forming apparatus via a network, it is determined whether or not the received job is a registration job that requires registration of the user information as authentication information. When it is determined that the received job is the registration job, the user information is obtained from the registration job and registered as the authentication information.

9 Claims, 10 Drawing Sheets

(56) References Cited

U.S. PATENT DOCUMENTS

2015/0029551 A1* 1/2015 Okada ................ G06K 15/1894
 358/1.15
2016/0212297 A1* 7/2016 Nagasawa ............. G06F 3/1293

* cited by examiner

*FIG. 6*
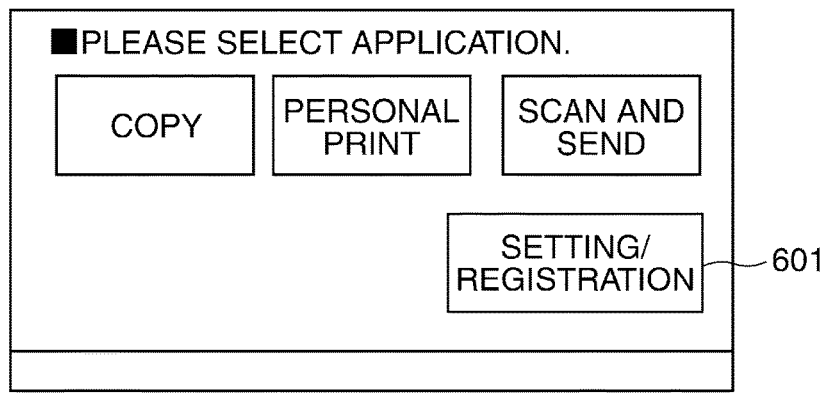
*FIG. 7*
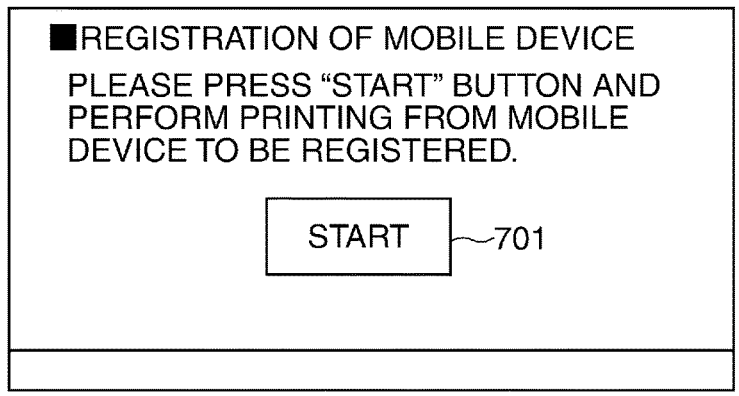
*FIG. 8*
800
| PROTOCOL | REVERSE RESOLUTION METHOD |
|---|---|
| AAP | SAME AS USER NAME |
| GCP | REFER TO JOB OWNER INFORMATION MANAGEMENT TABLE |
| CANON | SAME AS USER NAME |
|  |  |

| USER NAME | USER ID | E-MAIL ADDRESS | MAC ADDRESS |
|---|---|---|---|
| honda | honda | keisuke@gmail.com | 00:11:22:33:44:55 |
| kagawa | kagawa | shinji@gmail.com | 00:11:22:33:55:77 |
| nagatomo | nagatomo | yuuto@gmail.com | 11:22:33:44:55:66 |
| | | | |

■REGISTRATION OF MOBILE DEVICE
 JOB HAS BEEN RECEIVED. DO YOU REGISTER
 INFORMATION BELOW?

PROTOCOL: Google CROUD PRINTING(GCP)
E-MAIL ADDRESS: keisuke@gmail.com
MAC ADDRESS: 00:11:22:33:44:55

YES  NO

■GENERATION OF FILE FOR REGISTRATION OF MOBILE DEVICE

DO YOU GENERATE FILE FOR USE IN REGISTRATION OF MOBILE DEVICE?

YES   NO

| USER | FILE |
|---|---|
| honda | 20140703112233_mdregist.pdf |
| kagawa | 20140705144707_mdregist.pdf |
|  |  |

■REGISTRATION OF MOBILE DEVICE AND TEST PRINTING

PLEASE DOWNLOAD AND PRINT FILE BELOW.

20150703112233_mdregist.pdf

IMAGE FORMING APPARATUS CONTROL METHOD FOR THE IMAGE FORMING APPARATUS, AND STORAGE MEDIUM, THAT RECORD USER IDENTIFYING INFORMATION FOR USE IN IDENTIFYING PRINT DATA AS REGISTRATION INFORMATION

BACKGROUND OF THE INVENTION

Field of the Invention

The present invention relates to an image forming apparatus, a control method for the image forming apparatus, and a storage medium.

Description of the Related Art

Conventionally, image forming systems in which an MFP, which is an image forming apparatus, and a PC, which is an information processing apparatus, are connected together via a network are known (see, for example, Japanese Laid-Open Patent Publication (Kokai) No. H09-023329). An MFP described in Japanese Laid-Open Patent Publication (Kokai) No. H09-023329 receives a print job from the PC and stores the received print job in an HDD which the MFP has. The print job stored in the HDD has information on a logged-in user who has issued an instruction to send the print job from the PC to the MFP (hereafter referred to as "job owner information"), and when login information on a user who has logged in to the MFP and the job owner information match, the print job stored in the HDD is executed.

With recent diversification of communication devices, a print job may be sent to an MFP not only from a PC but also from a mobile device such as a tablet terminal, a cellular phone, or a smart phone.

When a print job is sent from a mobile device to an MFP, however, job owner information which the print job has varies according to printing applications and printing protocols to be used. For example, when a print job is sent to an MFP from a certain printing application run by a mobile device, the print job has, as job owner information, a user ID which is login information on a user for use in authentication performed by the MFP, and when a print job is sent to the MFP from another printing application run by the mobile device, the print job may have, as job owner information, an e-mail address which the mobile device has, not a user ID for use in authentication performed by the MFP. Therefore, when a print job is sent to the MFP from another printing application, login information and job owner information do not always match, and hence the print job may not be executed. Namely, there is a problem since the MFP cannot always execute a job received from the mobile device.

SUMMARY OF THE INVENTION

The present invention provides an image forming apparatus which is able to reliably execute a job received from a mobile device, a control method for the image forming apparatus, and a storage medium.

Accordingly, the present invention provides an image forming apparatus that receives a job having user information from an information processing apparatus connected to the image forming apparatus via a network, comprising a determination unit configured to determine whether the received job is a registration job that requires registration of the user information as authentication information, an obtaining unit configured to obtain the user information from the registration job when it is determined that the received job is the registration job, and a registration unit configured to register the obtained user information as the authentication information.

According to the present invention, a job received from a mobile device is reliably executed.

Further features of the present invention will become apparent from the following description of exemplary embodiments (with reference to the attached drawings).

BRIEF DESCRIPTION OF THE DRAWINGS

FIGS. 4A and 4B are views useful in explaining a screen which is displayed on an operating unit of the MFP or an operating unit of a mobile device when a user authentication unit in FIG. 3 performs user authentication, in which FIG. 4A shows an authentication screen, and FIG. 4B shows a touch instruction screen.

FIG. 6 is a view useful in explaining an application selection screen which is displayed on the operating unit of the mobile device in FIG. 1.

FIG. 7 is a view useful in explaining a registration screen which is displayed on the operating unit of the mobile device in FIG. 1.

FIG. 8 is a view useful in explaining a protocol correspondence table stored in the HDD in FIG. 2.

FIG. 9 is a view useful in explaining a job owner information management table which is managed by a job owner information management unit in FIG. 3.

FIG. 10 is a view useful in explaining a registration execution conformation screen which is displayed on the operating unit of the mobile device in FIG. 1.

FIG. 14 is a view useful in explaining an instruction screen which is displayed on the operating unit of the mobile device in FIG. 1.

FIG. 15 is a view useful in explaining a registration file management table which is stored in a ROM in FIG. 2.

FIG. 16 is a view useful in explaining a download screen which is displayed on the operating unit of the mobile device in FIG. 1.

DESCRIPTION OF THE EMBODIMENTS

Hereafter, a first embodiment of the present invention will be described in detail with reference to the drawings.

Figure 1:
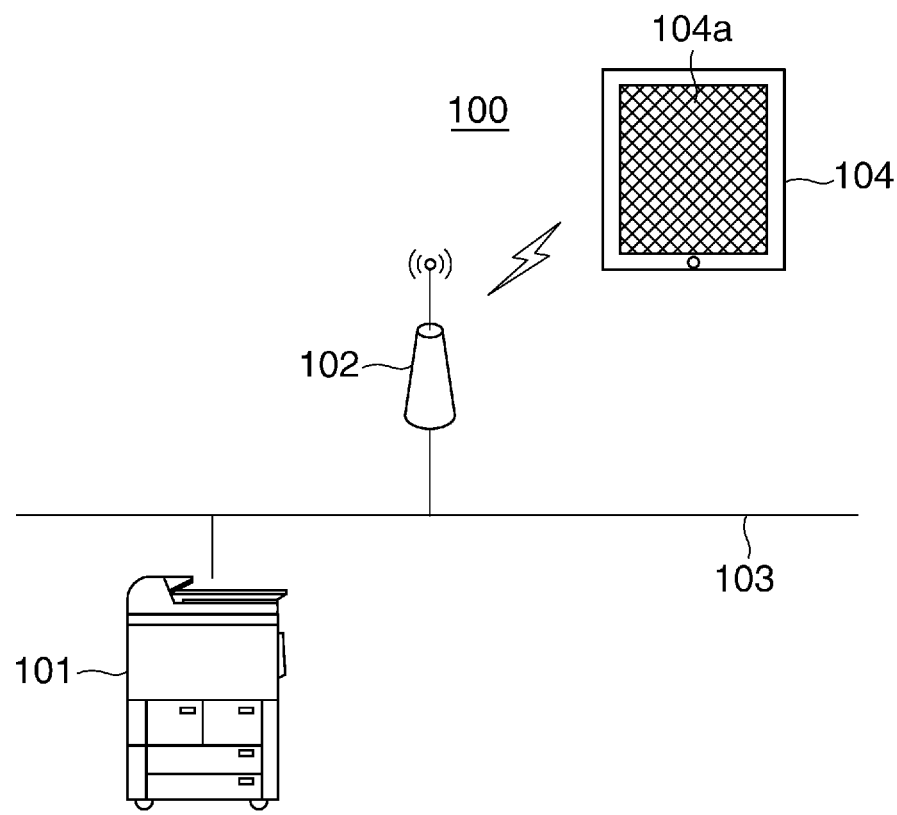
FIG. 1 is a conceptual diagram schematically showing an arrangement of an image forming system including an MFP which is an image forming apparatus according to a first embodiment of the present invention.

FIG. 1 is a conceptual diagram schematically showing an arrangement of an image forming system 100 including an MFP 101 which is an image forming apparatus according to a first embodiment of the present invention.

The image forming system 100 in FIG. 1 has the MFP 101, which is an image forming apparatus, and a wireless LAN router 102, and the MFP 101 and the wireless LAN router 102 are connected together via a LAN 103. A mobile device 104, which is an information processing apparatus, is connected to the wireless LAN router 102. The mobile device 104 is, for example, a cellular phone, a smart phone, or a table terminal and has an operating unit 104a comprised of, for example, a liquid crystal touch panel.

Figure 2:
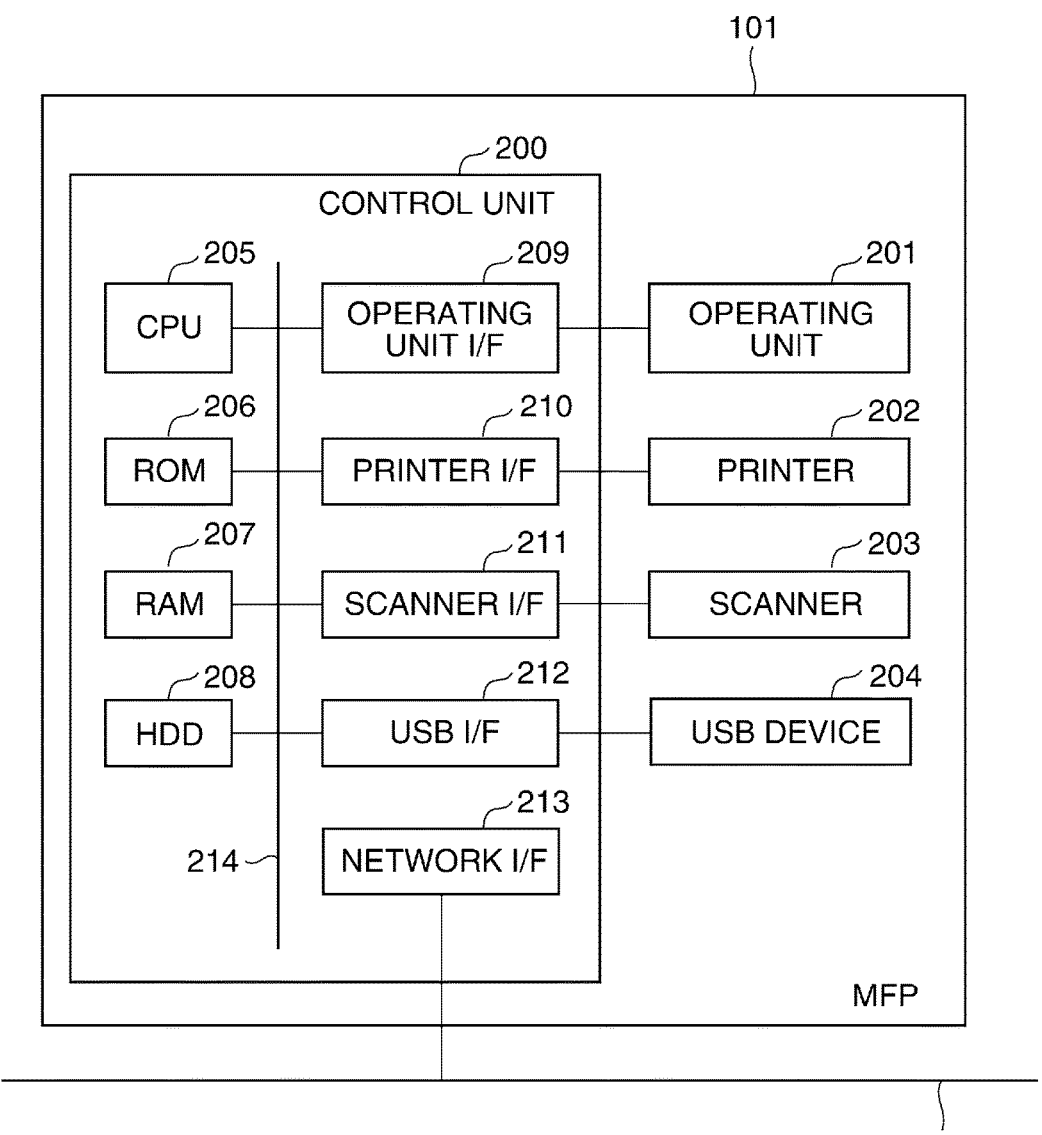
FIG. 2 is a block diagram schematically showing an internal arrangement of the MFP in FIG. 1.

FIG. 2 is a block diagram schematically showing an internal arrangement of the MFP 101 in FIG. 1.

The MFP 101 in FIG. 2 has a control unit 200, an operating unit 201, a printer 202, a scanner 203, and a USB device 204. The control unit 200 has a CPU 205, a ROM 206, a RAM 207, an HDD 208, an operating unit I/F 209, a printer I/F 210, a scanner I/F 211, a USB I/F 212, and a network I/F 213, and these component elements are connected to one another via an internal bus 214. The operating unit 201, the printer 202, the scanner 203, the USB device 204, and the LAN 103 are connected to the operating unit I/F 209, the printer I/F 210, the scanner I/F 211, the USB I/F 212, and the network I/F 213, respectively.

The operating unit 201 is, for example, a liquid crystal touch panel, and a user inputs instructions to the MFP 101 via the liquid crystal touch panel. The printer 202 prints image data on recording sheets. The scanner 203 reads originals to generate image data. The USB device 204 is, for example, a USB memory or a USB keyboard. The CPU 205 provides various types of control by running programs stored in the ROM 206. The ROM 206 stores various types of programs and various types of data such as a registration file management table 1500, to be described later.

The RAM 207 is a work memory for the CPU 205. The HDD 208 stores image data received from the mobile device 104 and image data generated by the scanner 203. The HDD 208 also stores software 300 and a protocol correspondence table 800 (FIG. 8), to be described later. Further, the HDD 208 stores a database on user information (hereafter referred to as "the user database") for use in user authentication performed by the MFP 101. It should be noted that in the present embodiment, user information is comprised of user names which are user IDs, and the user database may be stored in an external device.

Figure 3:
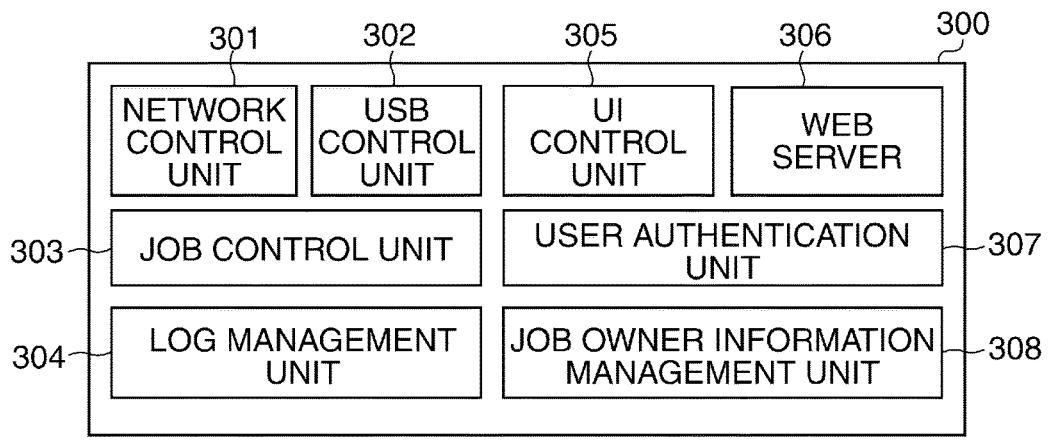
FIG. 3 is a view useful in explaining software stored in an HDD in FIG. 2.

FIG. 3 is a view useful in explaining the software 300 stored in the HDD 208 in FIG. 2.

The software 300 in FIG. 3 has a network control unit 301, a USB control unit 302, a job control unit 303, a log management unit 304, a UI (user interface) control unit 305, a Web server 306, a user authentication unit 307, and a job owner information management unit 308.

The network control unit 301 receives data from the mobile device 104 or sends data to the mobile device 104 via the network I/F 213. When the network control unit 301 receives data, it converts a format of the received data based on a type of a protocol such as HTTP, IPP, LPR, RAW, or WSD and sends the received data to the component elements of the software 300 which perform processing unique to the protocol. For example, when the network control unit 301 receives data on a printing protocol IPP, it converts a format of the received data so that the job control unit 303 can perform processing on the received data, and sends the data to the job control unit 303.

The USB control unit 302 receives data from the USB device 204 or sends data to the USB device 204 via the USB I/F 212. The job control unit 303 controls various types of jobs such as print jobs and scan jobs. For example, when print jobs relate to reservation printing, they are sorted on a user-by-user basis and stored in the HDD 208. The log management unit 304 analyzes executed jobs and stores, in the HDD 208, logs such as information on dates and times at which jobs were executed and users who issued instructions to execute the jobs. The UI control unit 305 controls display of various information on the operating unit 201.

Figure 4A:
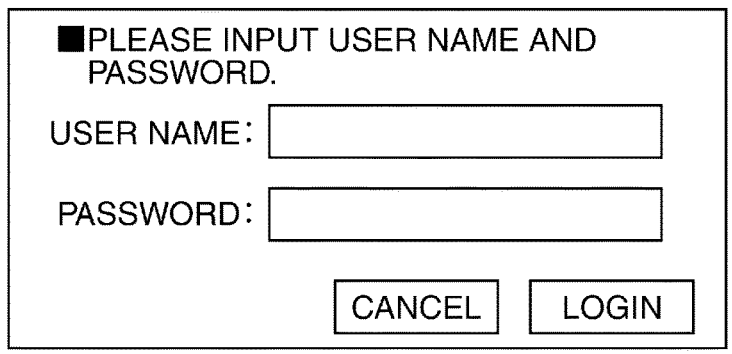
Figure 4B:
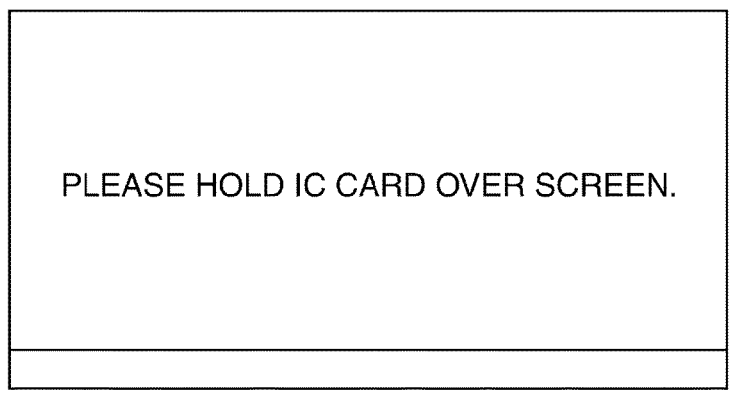

The Web server 306 receives, for example, a print job for which a printing protocol is HTTP from the network control unit 301. When user authentication has not yet been performed when the print job is received, the Web server 306 instructs the user authentication unit 307 to perform user authentication, and when user authentication has already been performed when the print job is received, the Web server 306 instructs a Web page generation unit (not shown) to create a Web page based on the print job. The user authentication unit 307 instructs the UI control unit 305 to display, for example, an authentication screen (FIG. 4A), which prompts a user to enter a user name, or a touch instruction screen (FIG. 4B), which prompts a user to touch an IC card having user information to a dedicated IC reader so that the user can log in to the MFP 101, on the operating unit 201 of the MFP 101 or the operating unit 104a of the mobile device 104. For example, when the user database stored in the HDD 208 has a user name and a password entered on the authentication screen, user authentication is performed.

The job owner information management unit 308 manages a job owner information management table 900 (FIG. 9), to be described later. The job owner information management unit 308 also keeps track of information on a user who is logged in the MFP 101, for example, a user name of the user.

Figure 5:
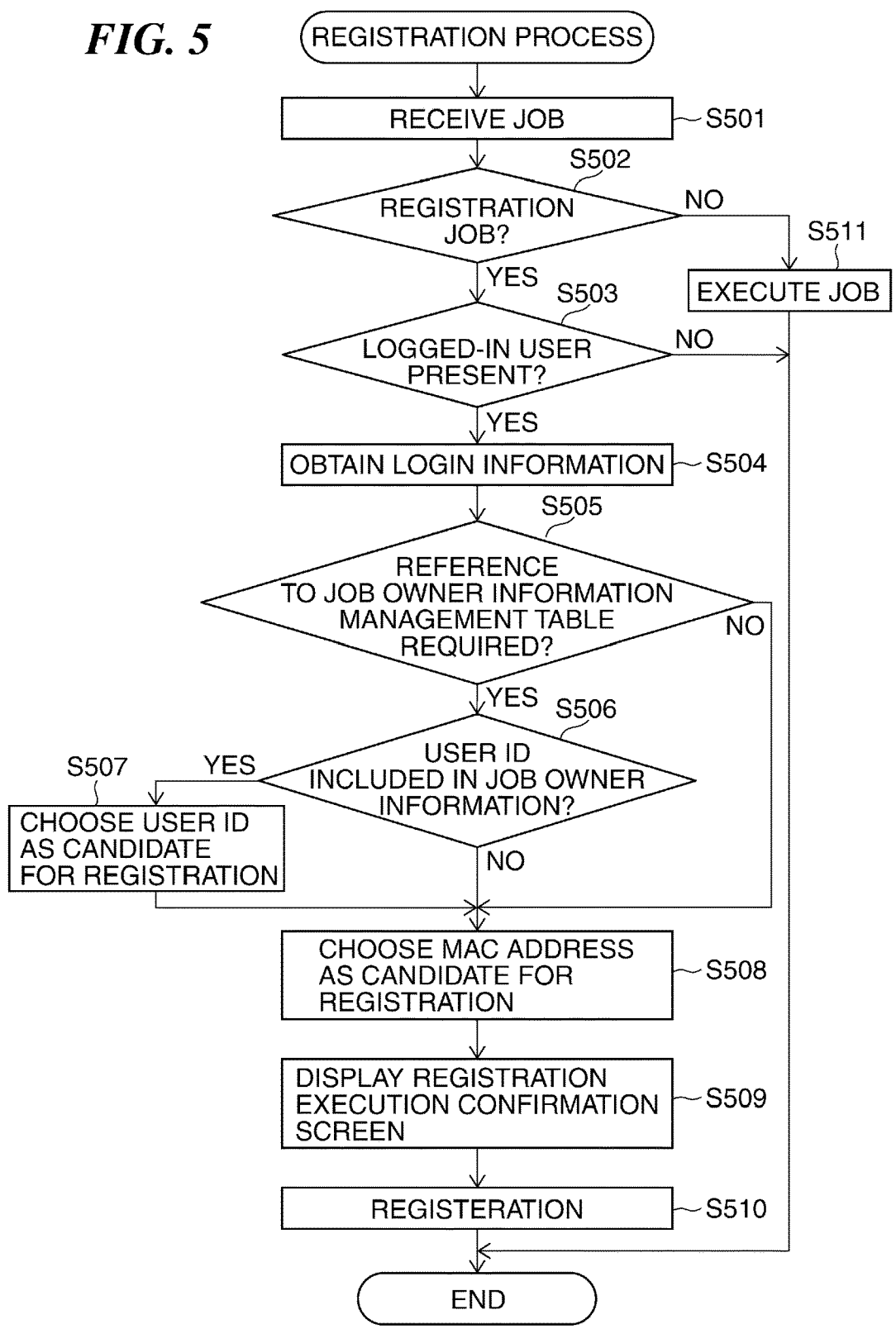
FIG. 5 is a flowchart showing the procedure of a registration process which is carried out by a CPU in FIG. 2.

FIG. 5 is a flowchart showing the procedure of a registration process which is carried out by the CPU 205 in FIG. 2.

Referring to FIG. 5, first, upon receiving a job from the mobile device 104 (step S501), the CPU 205 determines whether or not the received job is a registration job (step S502). In the present embodiment, a registration job means a job which has job owner information, for example, a user ID, an e-mail address, or a MAC address, and requests registration of the job owner information in the MFP 101 as authentication information (hereafter referred to as "job authentication information") for use in job authentication. When this job is executed, the job owner information is registered in the job owner information management table 900, to be described later. A registration job is sent from the mobile device 104 to the MFP 101 when a setting registration button 601 on an application selection screen 600 (FIG. 6) displayed on the operating unit 104a is depressed, and a start button 701 on a registration screen 700 (FIG. 7) displayed on the operating unit 104a is depressed.

As a result of the determination in the step S502, when the received job is not a registration job, for example, when the received job is a print job, the CPU 205 executes the print job (step S511) and terminates the present process. On the other hand, when the received job is a registration job, the CPU 205 determines whether or not there is a user who is logged in the MFP 101 (step S503). As a result of the determination in the step S503, when there is no user who is logged in the MFP 101, the CPU 205 terminates the present process. On the other hand, as a result of the determination in the step S503, when there is a user who is logged in the MFP 101, the CPU 205 obtains a user name which is login information on the user who is logged in the MFP 101 (step S504) and obtains a protocol defined for the registration job. Then, based on the protocol correspondence table 800 stored in the HDD 208, the CPU 205 determines whether or not the obtained protocol requires reference to the job owner information management table 900 at the time of job authentication (step S505).

The protocol correspondence table 800 indicates whether or not job owner information is usable as job authentication information. For example, it is indicated that when a protocol for a job is "AAP", job owner information is allowed to be used as it is in job authentication because the job owner information is a user ID, and the user ID which is the job owner information is the same as a user name which the user database has. Namely, when a protocol for a job is "AAP", reference to the job owner information management table 900 is not required. It is also indicated that when a protocol for a job is "GCP", job owner information which a registration job has is an e-mail address, and reference to the job owner information management table 900 is required when job authentication is performed.

Referring to FIG. 5 again, as a result of the determination in the step S505, when the CPU 205 determines that the obtained protocol is not a protocol that requires reference to the job owner information management table 900, the process proceeds to step S508, to be described later, with the step S507 skipped. On the other hand, when the obtained protocol is a protocol that requires reference to the job owner information management table 900, the CPU 205 determines whether or not a user ID is included in the job owner information which the registration job has (step S506).

As a result of the determination in the step S506, when a user ID is included in the job owner information which the registration job has, the CPU 205 chooses the user ID as a candidate for registration in the job owner information management table 900 (step S507), and also chooses a MAC address of the mobile device 104, which is included in the job owner information, as a candidate for registration in the job owner information management table 900 (step S508).

As a result of the determination in the step S506, when the CPU 205 determines that no user ID is included in the job owner information which the registration job has, the process proceeds to the step S508 with the step S507 skipped. It should be noted that when the job owner information includes an e-mail address, the e-mail address may be chosen in the step S508 as a candidate for registration.

Then, the CPU 205 displays a registration execution confirmation screen 1000 (FIG. 10) on the operating unit 104a (step S509). When the user depresses an OK button 1001 which the registration execution confirmation screen 1000 has, the CPU 205 registers, in the job owner information management table 900, information on the candidate for registration in association with the user name obtained in the step S504 (step S510) and terminates the present process. Specifically, when the job owner information includes a user ID (YES in the step S506), the CPU 205 registers, in the job owner information management table 900, the user ID and a MAC address in association with the user name. When the obtained protocol is not a protocol that requires reference to the job owner information management table 900 (NO in the step S505), or when the job owner information does not include a user ID (NO in the step S506), the CPU 205 registers, in the job owner information management table 900, only a MAC address in association with the user name.

The job owner information management table 900 has items comprised of "user name", "user ID", and "MAC address". As "user name", a user name of a user logged in the MFP 101 which is obtained in the step S504 is stored. As "user ID", a user ID included in job owner information which a registration job has and chosen in the step S507 as a candidate for registration is stored. As "MAC address", a MAC address of the mobile device 104 and is chosen in the step S508 as a candidate for registration is stored.

It should be noted that the job owner information management table 900 may have an item "e-mail address" as well as the items "user name", "user ID", and "MAC address", and when the job owner information management table 900 has the item "e-mail address", an e-mail address of the mobile device 104, which is chosen in the step S508 as a candidate for registration is stored as "e-mail address". It should be noted that the e-mail address of the mobile device 104 stored as "e-mail address" may be used as a user ID in job authentication information.

According to the process in FIG. 5, when a registration job is received from the mobile device 104, a user ID and a MAC address included in job owner information obtained from the received registration job are stored in association with a user name obtained in the step S504 (step S510). As a result, when the MFP 101 executes a job such as a print job other than the registration job after the user ID and the MAC address included in the job owner information are registered in the job owner information management table 900, a user ID and a MAC address included in the print job are those obtained from the mobile device 104 which has the same user ID and the same MAC address as the user ID and the MAC address registered as user authentication information, and therefore, authentication of the print job is allowed to be performed based on the user ID and the MAC address included in the print job and the user ID and the MAC address registered as the user authentication information. Namely, even when a user ID and a MAC address included in a print job do not correspond to, for example, do not match a user name which is login information on a user of the MFP 101, authentication of the print job is allowed to be performed, and hence jobs received from the mobile device 104 are reliably executed.

Figure 11:
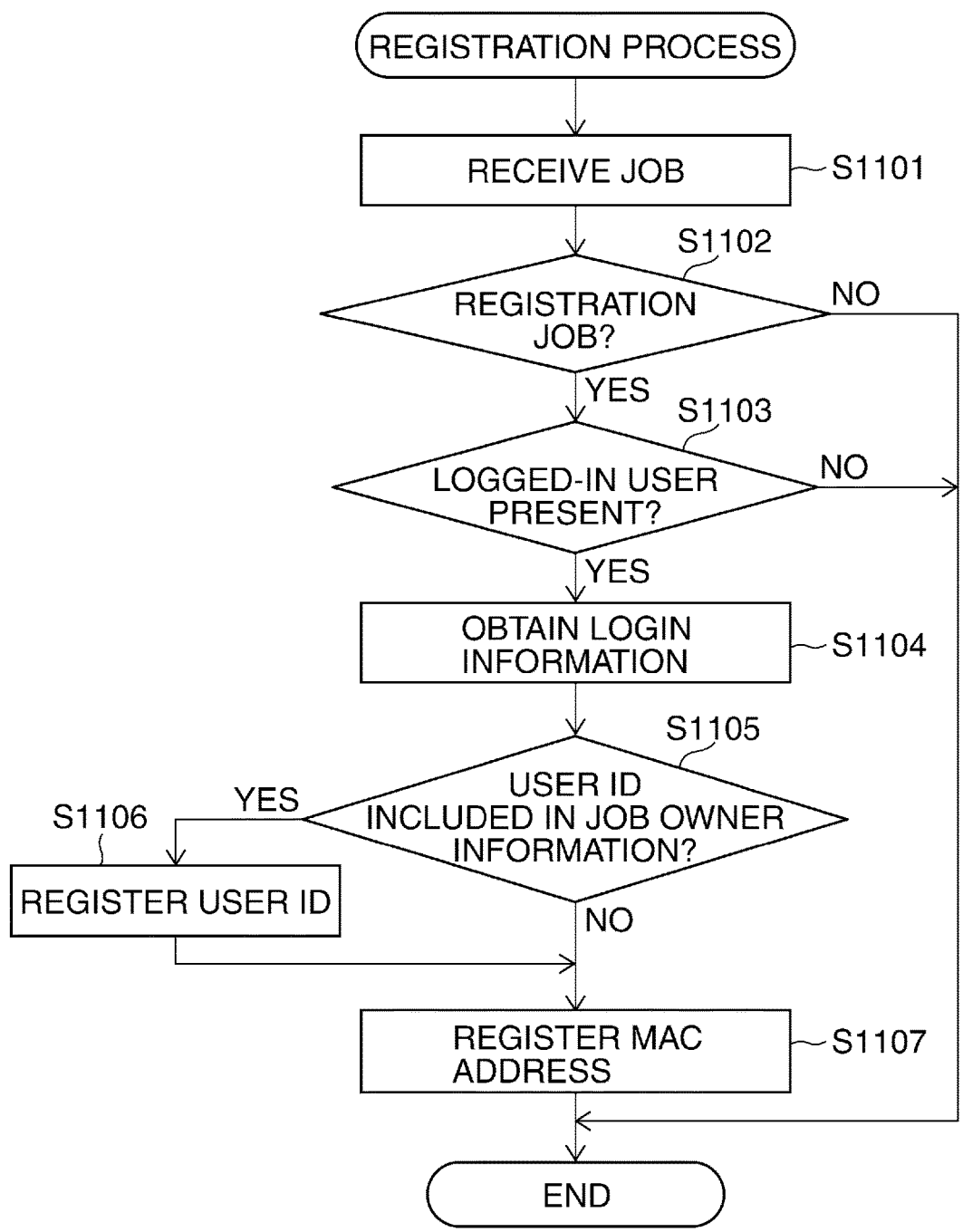
FIG. 11 is a flowchart showing the procedure of a variation of the registration process in FIG. 5.

FIG. 11 is a flowchart showing the procedure of a variation of the registration process in FIG. 5.

Figure 12:
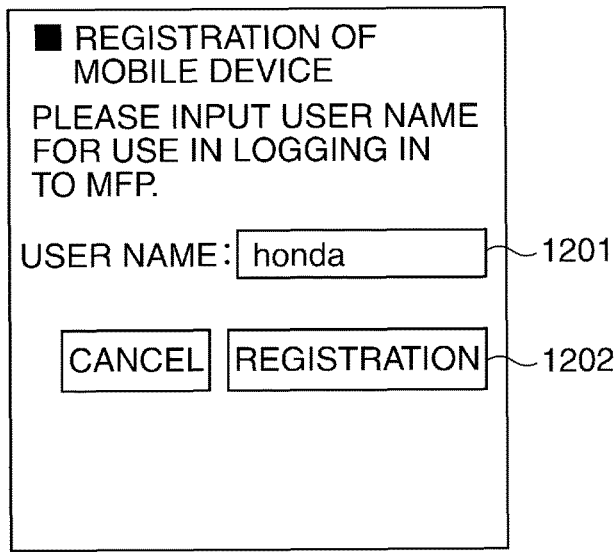
FIG. 12 is a view useful in explaining a registration screen which is displayed on the operating unit of the mobile device in FIG. 1.

Referring to FIG. 11, first, upon receiving a job from the mobile device 104 (step S1101), the CPU 205 determines whether or not the received job is a registration job (step S1102). In the process in FIG. 5, a registration job means a job that is sent from the mobile device 104 to the MFP 101 when the start button 701 on the registration screen 700 displayed on the operating unit 104a is depressed, whereas in the process in FIG. 11, a registration job means a job that is sent from the mobile device 104 to the MFP 101 when a user name is entered into an input field 1201 on a registration screen 1200 (FIG. 12) and a registration button 1201 on the registration screen 1200 is depressed. In the present embodiment, a registration job that is sent from the mobile device 104 to the MFP 101 through the registration screen 1200 has a job name with a keyword "mdregist" which indicates that the job is a registration job. For example, when a user name "honda" is entered into the input field 1201, a job name of a registration job is "mdregist_honda" comprised of the keyword "mdregist" and the user name "honda". Thus, in the step S1102, based on a job name of the received job, it is easily determined whether or not the received job is a registration job. It should be noted that when a job has, for example, a packet structure comprised of a header section and a data section, a keyword and a user name may be included in the header section or the data section.

As a result of the determination in the step S1102, when the received job is not a registration job (when the keyword "mdregist" is not included in the job name), the CPU 205 terminates the present process. On the other hand, when the received job is a registration job (when the keyword "mdregist" is included in the job name), the CPU 205 determines whether or not a user corresponding to a user name in the job name is logged in the MFP 101 (step S1103).

As a result of the determination in the step S1103, when a user corresponding to the user name in the job name is not logged in the MFP 101, the CPU 205 terminates the present process. On the other hand, when a user corresponding to the user name in the job name is logged in the MFP 101, the CPU 205 obtains a user name which is login information on the user logged in the MFP 101 (step S1104).

Then, the CPU 205 determines whether or not a user ID is included in the job owner information which the registration job has (step S1105). As a result of the determination in the step S1105, when the CPU 205 determines that no user ID is included in the job owner information which the registration job has, the process proceeds to step S1107, to be described later. On the other hand, when a user ID is included in the job owner information which the registration job has, the CPU 205 registers, in the job owner information management table 900, the user ID in association with the user name obtained in the step S1104 (step S1106), further registers, in the job owner information management table 900, a MAC address of the mobile device 104 included in the job owner information in association with the user name obtained in the step S1104 (step S1107) and terminates the present process.

According to the process in FIG. 11, the same effects as those in the process in FIG. 5 are obtained.

A description will now be given of a second embodiment of the present invention.

The second embodiment of the present invention is basically the same as the first embodiment described above in terms of constructions and operations, differing from the first embodiment in that a registration file generated by the MFP 101 is included in a registration job. Features of constructions and operations that are the same as those in the first embodiment will thus not be described, and only constructions and operations different from those of the first embodiment will be described below.

Figure 13:
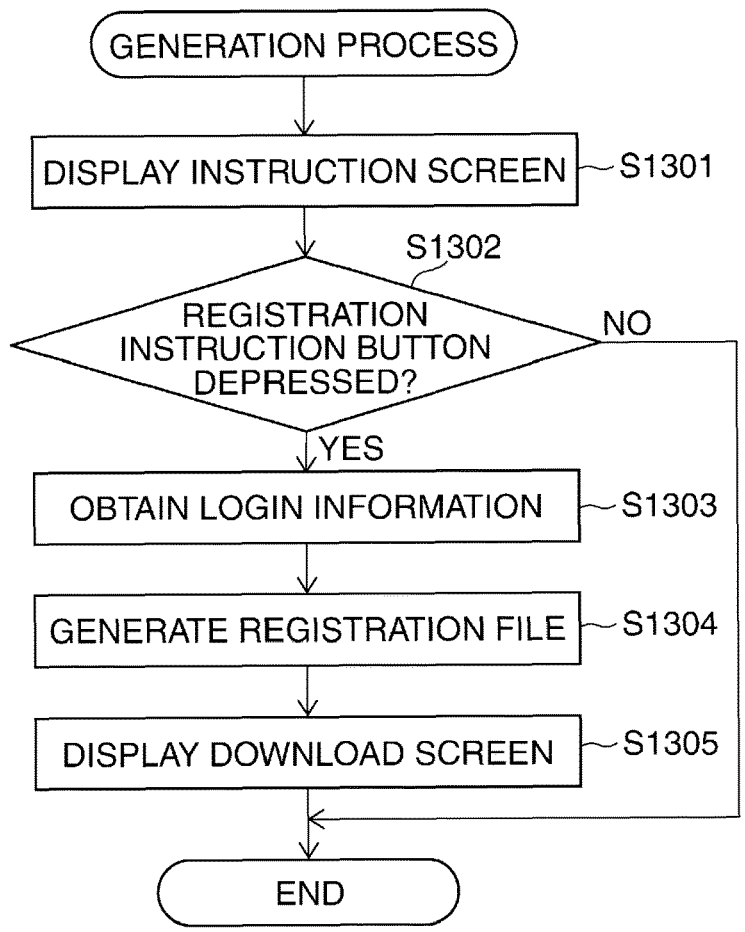
FIG. 13 is a flowchart showing the procedure of a generation process in which a registration file to be downloaded to the mobile device in FIG. 1 is generated.

FIG. 13 is a flowchart showing the procedure of a generation process in which a registration file to be downloaded by the mobile device 104 in FIG. 1 is generated. The process in FIG. 13 is carried out by the CPU 205.

Referring to FIG. 13, first, when a user logs in to the MFP 101 through a Web browser displayed on the operating unit 104a of the mobile device 104, the mobile device 104 used by the user to log in displays an instruction screen 1400 (FIG. 14) for issuing an instruction to generate a registration file is displayed on the operating unit 104a (step S1301). Next, the CPU 205 determines whether or not a registration instruction button 1401, which the instruction screen 1400 has, has been depressed (step S1302). As a result of the determination in the step S1302, when the registration instruction button 1401 has not been depressed, the CPU 205 terminates the present process, and on the other hand, when the registration instruction button 1401 has been depressed, the CPU 205 obtains a user name which is login information on the user logged in the MFP 101 (step S1303).

Then, the CPU 205 generates a registration file which indicates that the job received by the MFP 101 is a registration job (step S1304). The CPU 205 also registers, in a registration file management table 1500 (FIG. 15), the registration file in association with the user name of the user logged in the MFP 101, displays a download screen 1600 (FIG. 16), which shows a destination to which the registration file is linked, on the operating unit 104a (step S1305) and terminates the present process.

Figure 17:
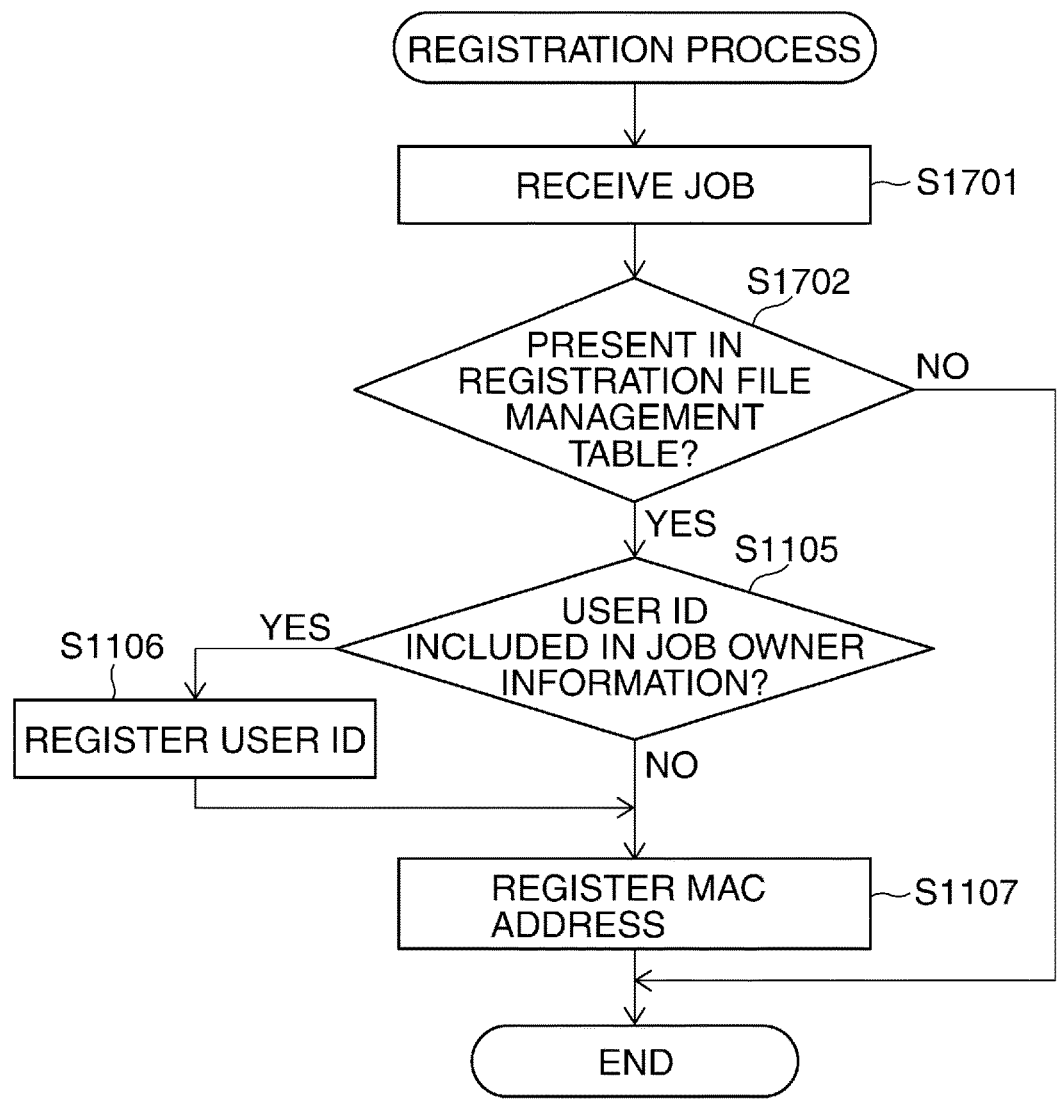
FIG. 17 is a flowchart showing the procedure of a variation of the registration process in FIG. 11, which is carried out by the CPU in FIG. 2.

FIG. 17 is a flowchart showing the procedure of a variation of the registration process in FIG. 11, which is carried out by the CPU 205 in FIG. 2.

The process in FIG. 17 is started in response to a registration file on the download screen 1600 displayed on the operating unit 104a in the step S1305 in FIG. 13 being downloaded to the mobile device 104, and a registration job having the downloaded registration file being sent from the mobile device 104 to the MFP 101. It should be noted that processes in steps S1105 to S1107 in FIG. 17 are the same as those in the steps S1105 to S1107 in FIG. 11, and therefore, only features different from the processes in FIG. 11 will be described below.

Referring to FIG. 17, first, upon receiving a registration job including a registration file (step S1701), the CPU 205 determines whether or not the registration file included in the registration job is present in the registration file management table 1500 (step S1702). As a result of the determination in the step S1702, when the registration file included in the registration job is not present in the registration file management table 1500, the CPU 205 terminates the present process. On the other hand, when the CPU 205 determines that the registration file included in the registration job is present in the registration file management table 1500, the process proceeds to the step S1105.

According to the process in FIG. 17, the same effects as those in the process in FIG. 5 are obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-006680, filed Jan. 16, 2015 which is hereby incorporated by reference herein in its entirety.

What is claimed is:

1. An image processing apparatus that uses an image forming device configured to form an image on a sheet and having a user interface that permits a user to login to the image processing apparatus using a specific account, among a plurality of accounts stored in a storage device, identified by at least a specific user name and a specific user ID in association with the specific account, the image processing apparatus comprising:
a controller, having a processor that executes instructions stored in a memory or having circuitry, and configured to, in a state where the user is logged in to the image processing apparatus using login information containing the specific user name associated with the specific account:
obtain, from an external device, a first registration print job that includes the specific user ID, and store, in the storage device, the first registration print job in association with the specific account;
obtain, from the external device, a second registration print job that does not include the specific user ID but instead includes a specific e-mail address, and store, in the storage device, the second registration print job in association with the specific account;
store, in the storage device, the specific e-mail address in association with the specific account; and
cause the image forming device to perform image formation based on the first registration print job and the second registration print job.

2. The image processing apparatus according to claim 1, wherein the controller is further configured to:
store, in the storage device, the first registration print job in association with the specific user account based on the first registration print job being received; and
store, in the storage device, the second registration print job in association with the specific user account based on the second registration print job being received.

3. The image processing apparatus according to claim 1, wherein the controller is further configured to:
obtain, from the external device, a print job that includes a user ID or an e-mail address;
determine whether the obtained print job is associable using the user ID or the e-mail address included in the obtained print job;
when the user ID included in the obtained print job matches the specific ID, associate the obtained print job with the specific account based on the user ID matching the specific ID; and
when the e-mail address included in the obtained print job matches the specific e-mail address, associate the obtained print data with the specific account based on the e-mail address matching the specific e-mail address.

4. The image processing apparatus according to claim 1, wherein the user interface is configured to receive the specific user name to perform login authentication.

5. The image processing apparatus according to claim 1, wherein the user interface is configured to perform login authentication based on information obtained from an IC card.

6. The image processing apparatus according to claim 1, wherein the controller is further configured to, in a state where a new obtained print job includes the specific e-mail address, store, in the storage device, the specific e-mail address in association with the specific account based on the second registration print job that included the specific e-mail address.

7. An image processing apparatus that uses an image forming device configured to form an image on a sheet and having a user interface that permits a user to login to the image processing apparatus using a specific account, among a plurality of accounts stored in a storage device, identified by at least a specific user name and a specific user ID in association with the specific account, the image processing apparatus comprising:
a controller, having a processor that executes instructions stored in a memory or having circuitry, and configured to, in a state where the user is logged in to the image processing apparatus using login information containing the specific user name associated with the specific account:
obtain, from an external device, a first registration print job that includes the specific user ID, and store, in the storage device, the first registration print job in association with the specific account;
obtain, from the external device, a second registration print job that does not include the specific user ID but instead includes a specific MAC, address, and store, in the storage device, the second registration print data in association with the specific account;
store, in the storage device, the specific MAC address in association with the specific account; and
cause the image forming device to perform image formation based on the first registration print job and the second registration print job.

8. A control method for an image processing that uses an image forming device configured to form an image on a sheet and having a user interface that permits a user to login to the image processing apparatus using a specific account, among a plurality of accounts stored in a storage device, identified by at least a specific user name and a specific user ID in association with the specific account, the method comprising the steps of, in a state where the user is logged in to the image processing apparatus using login information containing the specific user name associated with the specific account:
obtaining, from an external device, a first registration print job that includes the specific user ID, and storing, in the storage device, the first registration print job in association with the specific account;
obtaining, from the external device, a second print job that does not include the specific user ID but instead includes a specific e-mail address, and storing, in the storage device, the second registration print job in association with the specific account;
storing, in the storage device, the specific e-mail address in association with the specific account; and
causing the image forming device to perform image formation based on the first registration print job and the second registration print job.

9. A non-transitory computer-readable storage medium storing a program executable by a controller having a processor, of an image processing apparatus that uses an image forming device configured to form an image on a sheet and having a user interface that permits a user to login to the image processing apparatus using a specific account, among a plurality of accounts stored in a storage device, identified by at least a specific user name and a specific user ID in association with the specific account, to execute a method comprising the steps of:

obtaining, from an external device, a first registration print job that includes the specific user ID, and storing, in the storage device, the first registration print job in association with the specific account;

obtaining, from the external device, a second print job that does not include the specific user ID but instead includes a specific e-mail address, and storing, in the storage device, the second registration print job in association with the specific account;

storing, in the storage device, the specific e-mail address in association with the specific account; and causing the image forming device to perform image formation based on the first registration print job and the second registration print job.

* * * * *